United States Patent
Aguayo et al.

(10) Patent No.: US 10,258,841 B2
(45) Date of Patent: *Apr. 16, 2019

(54) GOLF CLUB HEAD WITH TEXTURED STRIKING FACE

(71) Applicant: DUNLOP SPORTS CO. LTD., Kobe-shi (JP)

(72) Inventors: Roberto Aguayo, Downey, CA (US); Jeffrey D. Brunski, Los Angeles, CA (US); Matthew R. Daraskavich, Huntington Beach, CA (US); Sharon J. Park, Irvine, CA (US)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/923,302

(22) Filed: Mar. 16, 2018

(65) Prior Publication Data

US 2018/0236315 A1 Aug. 23, 2018

Related U.S. Application Data

(63) Continuation of application No. 15/370,735, filed on Dec. 6, 2016, now Pat. No. 9,950,225, which is a
(Continued)

(51) Int. Cl.
*A63B 53/04* (2015.01)
*B23K 26/352* (2014.01)
(Continued)

(52) U.S. Cl.
CPC ............ *A63B 53/047* (2013.01); *B23C 3/28* (2013.01); *B23K 26/0006* (2013.01); *B23K 26/0093* (2013.01); *B23K 26/0622* (2015.10); *B23K 26/352* (2015.10); *B23K 26/355* (2018.08); *B23K 26/361* (2015.10); *B23K 26/362* (2013.01); *B23K 26/60* (2015.10); *A63B 53/04* (2013.01); *A63B 2053/0408* (2013.01);
(Continued)

(58) Field of Classification Search
CPC ............ A63B 2053/0445; A63B 53/04; A63B 53/047; A63B 2053/0416; A63B 2053/0408
USPC .................................................. 473/330, 331
See application file for complete search history.

(56) References Cited

U.S. PATENT DOCUMENTS

1,289,553 A 12/1918 Sanders
1,965,954 A 7/1934 Davis
(Continued)

OTHER PUBLICATIONS

Publication on Golf.com dated Nov. 10, 2011; http://www.golf.com/equipment/nike-yr-pro-forged-ds-wedge.
(Continued)

*Primary Examiner* — Benjamin Layno
(74) *Attorney, Agent, or Firm* — Oliff PLC

(57) ABSTRACT

A golf club head includes a heel portion, a toe portion, a hosel, and a striking face. The striking face includes a plurality of scorelines each having an average depth no less than about 0.10 mm, a plurality of micro-grooves each having an average depth no greater than about 0.010 mm, and a plurality of textured surface treatment regions superimposed on the micro-grooves so as to at least partially intersect the micro-grooves.

20 Claims, 11 Drawing Sheets

Related U.S. Application Data continuation of application No. 14/615,192, filed on Feb. 5, 2015, now Pat. No. 9,579,550, which is a continuation of application No. 13/829,238, filed on Mar. 14, 2013, now Pat. No. 8,979,670.

(60) Provisional application No. 61/754,302, filed on Jan. 18, 2013.

(51) Int. Cl.

| | | |
|---|---|---|
| *B23C 3/28* | (2006.01) | |
| *B23K 26/00* | (2014.01) | |
| *B23K 26/0622* | (2014.01) | |
| *B23K 26/60* | (2014.01) | |
| *B23K 26/362* | (2014.01) | |
| *B23K 26/361* | (2014.01) | |
| *B23K 101/34* | (2006.01) | |
| *B23K 103/02* | (2006.01) | |
| *B23K 103/04* | (2006.01) | |
| *B23K 103/08* | (2006.01) | |
| *B23K 103/14* | (2006.01) | |

(52) U.S. Cl.
CPC .......... *A63B 2053/0416* (2013.01); *A63B 2053/0445* (2013.01); *B23K 2101/34* (2018.08); *B23K 2103/02* (2018.08); *B23K 2103/04* (2018.08); *B23K 2103/05* (2018.08); *B23K 2103/08* (2018.08); *B23K 2103/14* (2018.08); *Y10T 409/303752* (2015.01)

(56) References Cited

U.S. PATENT DOCUMENTS

| | | | |
|---|---|---|---|
| D257,736 S | 12/1980 | Lyon et al. | |
| 5,176,384 A | 1/1993 | Sala et al. | |
| 5,398,929 A | 3/1995 | Kitaichi | |
| 5,403,007 A | 4/1995 | Chen | |
| 5,447,311 A | 9/1995 | Viollaz et al. | |
| 5,472,201 A | 12/1995 | Aizawa et al. | |
| 5,531,444 A * | 7/1996 | Buettner ............... | A63B 53/04 473/349 |
| 5,643,103 A | 7/1997 | Aizawa | |
| D395,476 S | 6/1998 | Pond et al. | |
| D399,276 S | 10/1998 | Hettinger et al. | |
| D399,277 S | 10/1998 | Ezaki | |
| D399,549 S | 10/1998 | Hettinger et al. | |
| 5,967,903 A | 10/1999 | Cheng | |
| D420,079 S | 2/2000 | Frazetta | |
| D478,949 S | 8/2003 | DeLaCruz | |
| D570,934 S | 6/2008 | Ban et al. | |
| D588,222 S | 3/2009 | Takahashi | |
| D588,666 S | 3/2009 | Takahashi | |
| 7,594,863 B2 | 9/2009 | Ban | |
| D606,605 S | 12/2009 | Wada et al. | |
| D607,070 S | 12/2009 | Wada et al. | |
| D607,071 S | 12/2009 | Wada et al. | |
| 7,695,377 B2 | 4/2010 | Yamagishi et al. | |
| D617,406 S | 6/2010 | Carlyle et al. | |
| 7,918,747 B2 | 4/2011 | Johnson et al. | |
| 7,976,404 B2 * | 7/2011 | Golden ............... | A63B 53/047 473/330 |
| D643,490 S | 8/2011 | Wada et al. | |
| 8,012,036 B2 | 9/2011 | Nakamura | |
| D658,248 S | 4/2012 | Nunez et al. | |
| 8,287,401 B2 | 10/2012 | Tateno et al. | |
| 8,684,861 B2 | 4/2014 | Carlyle et al. | |
| 8,858,361 B2 | 10/2014 | Ripp et al. | |
| 8,979,670 B2 * | 3/2015 | Aguayo ............... | B23K 26/0084 473/331 |
| 9,308,422 B2 | 4/2016 | Ripp et al. | |
| 9,403,068 B2 | 8/2016 | Golden et al. | |
| 9,950,225 B2 * | 4/2018 | Aguayo ............... | B23K 26/0084 |
| 2008/0020859 A1 | 1/2008 | Yamagishi et al. | |
| 2008/0051212 A1 | 2/2008 | Voges | |
| 2008/0125241 A1 | 5/2008 | Tateno et al. | |
| 2008/0300068 A1 | 12/2008 | Chao | |
| 2011/0111883 A1 | 5/2011 | Cackett | |
| 2011/0165963 A1 | 7/2011 | Cackett et al. | |
| 2011/0256956 A1 | 10/2011 | Hocknell et al. | |
| 2011/0269567 A1 | 11/2011 | Ban et al. | |

OTHER PUBLICATIONS

Photograph of golf club described in Nov. 10, 2011 publication on Golf.com.
U.S. Appl. No. 12/123,456, filed Apr. 1, 2014 in the name of Ripp.
Jun. 30, 2017 Office Action issued in U.S. Appl. No. 15/370,735.
U.S. Appl. No. 13/829,238, filed Mar. 14, 2013 in the name of Aguayo et al.
Nov. 24, 2014 Notice of Allowance issued in U.S. Appl. No. 13/829,238.
U.S. Appl. No. 14/615,192, filed Feb. 5, 2015 in the name of Aguayo et al.
Dec. 3, 2015 Office Action issued in U.S. Appl. No. 14/615,192.
May 18, 2016 Office Action issued in U.S. Appl. No. 14/615,192.
Aug. 24, 2016 Notice of Allowance issued in U.S. Appl. No. 14/615,192.
Dec. 6, 2016 Corrected Notice of Allowance issued in U.S. Appl. No. 14/615,192.
U.S. Appl. No. 15/370,735, filed Dec. 6, 2016 in the name of Aguayo et al.
Dec. 12, 2017 Notice of Allowance issued in U.S. Appl. No. 15/370,735.

\* cited by examiner

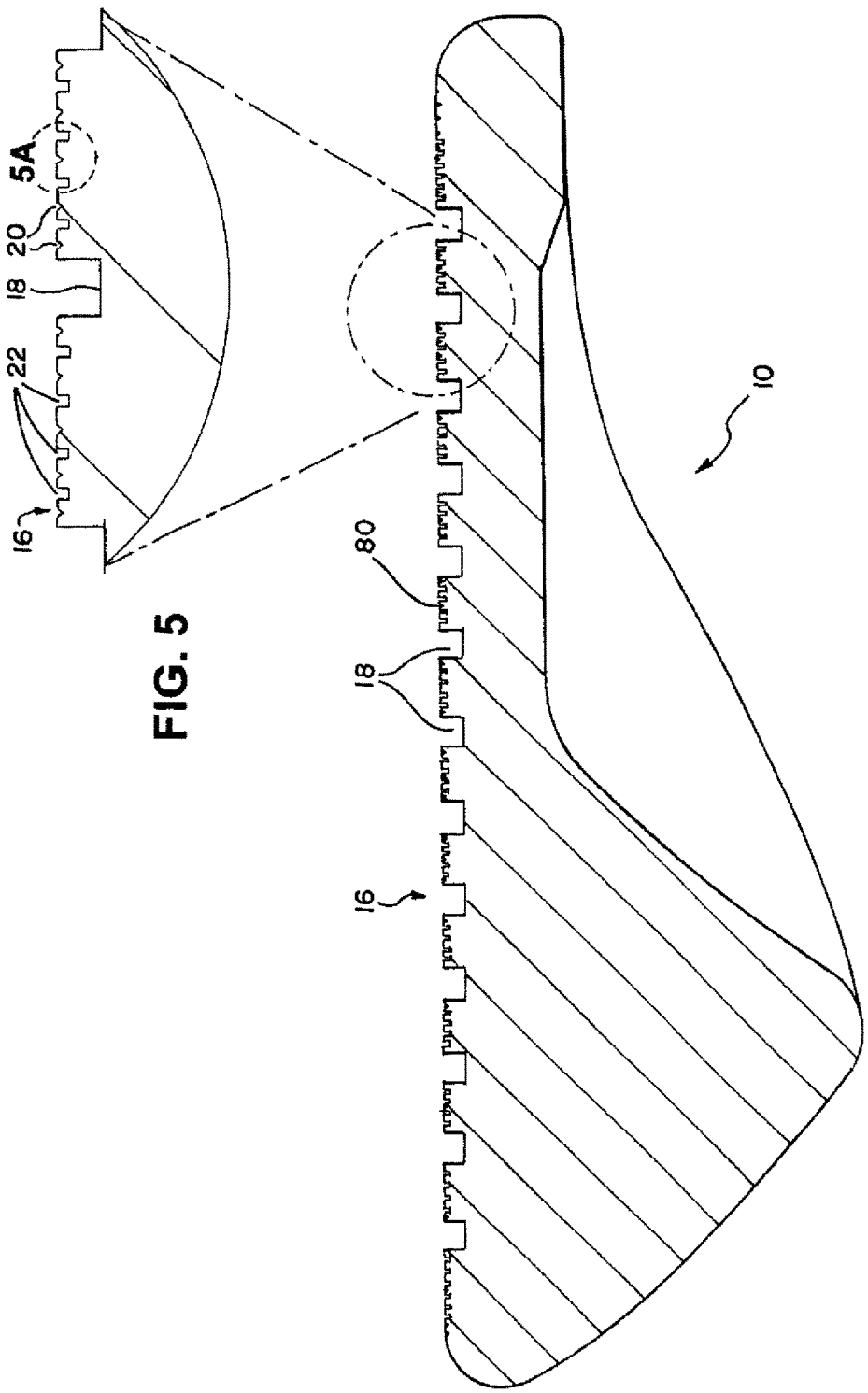

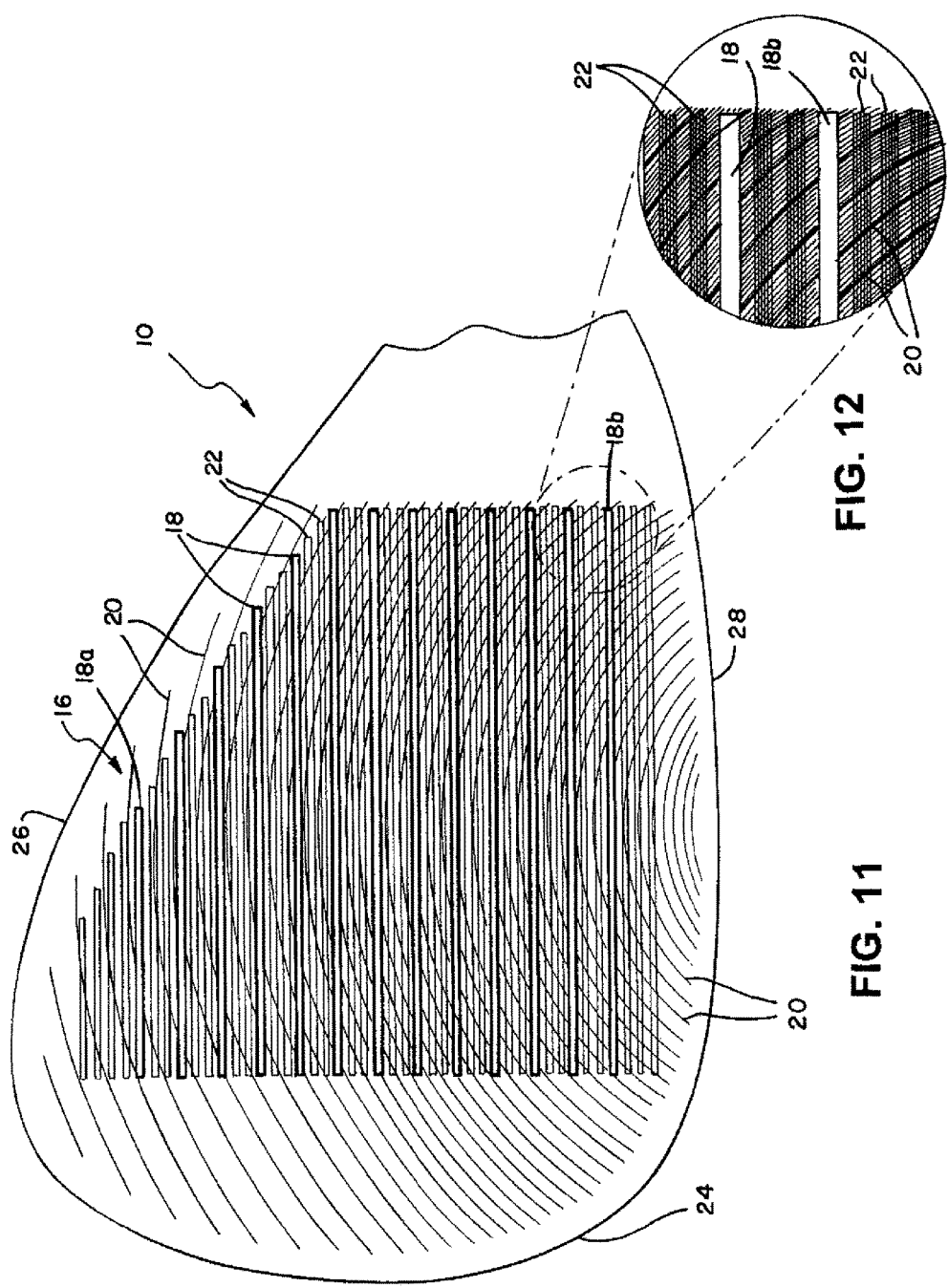

GOLF CLUB HEAD WITH TEXTURED STRIKING FACE

CROSS-REFERENCE TO RELATED APPLICATIONS

This is a Continuation of U.S. application Ser. No. 15/370,735 filed Dec. 6, 2016, now U.S. Pat. No. 9,950,225, which is a Continuation of U.S. application Ser. No. 14/615,192 filed Feb. 5, 2015, now U.S. Pat. No. 9,579,550, which is a Continuation of U.S. application Ser. No. 14/174,671 filed Feb. 6, 2014, which is a Continuation of application Ser. No. 13/829,238 filed Mar. 14, 2013, now U.S. Pat. No. 8,979,670, which claims the benefit, under 35 U.S.C. § 119(e), of co-pending U.S. Provisional Application No. 61/754,302; filed Jan. 18, 2013, the subject matter of which is incorporated herein by reference in its entirety.

BACKGROUND

This disclosure relates generally to the field of golf clubs. More particularly, it relates to a golf club head with a textured striking face for imparting greater spin to a golf ball when the golf ball is struck.

A common goal of golf club head design, specifically for iron-type and utility-type club heads, and particularly for wedges, is to create a striking face for the club head that imparts significant spin to a struck ball. The striking face of such a club head typically has a plurality of parallel horizontal grooves or score lines. These score lines assist in imparting spin at least by channeling water and debris, and by increasing the friction between the striking face and the surface of the ball. The spin-imparting qualities provided by such score lines are limited, however, by United States Golf Association ("USGA" herein) regulations governing score line geometry (and similar regulations of other international golf equipment regulatory bodies). Moreover, conventional score lines fail to account for low-scale dynamic interactions between the striking face and the ball.

Further improvements in the spin-imparting characteristics of club head striking faces have included the provision of low-scale surface textures in addition to, or in place of, the conventional score lines. Such surface textures, however, tend not to take into account the specific interaction between a conventional elastomer-covered golf ball and a metallic striking face. Moreover, conventional surface texturing is subject to rapid wear, is often costly to produce, and may detract from the aesthetic quality of the club head. Furthermore, conventional striking face textures are generally ineffective at providing a high degree of spin for each of the multitude of different types of golf shots that a golfer may attempt. For example, a ball hit with a club having a conventional club head that is swung at a specific speed would have different degrees of spin depending on whether the ball is squarely addressed by the club face or hit with an open club face. Other conditions, such as moisture on the club face and/or the ball, and whether the ball is struck with a full swing, half swing, or chip-type swing of the club, can affect the degree of spin imparted to the ball.

The creation of spin, particularly back-spin, on a struck golf ball, is largely a function of the magnitude of the frictional contact or "traction" between the striking face of the club head and the ball on impact. Where a high degree of back-spin is desired, as in higher number irons and wedges, maximizing this traction factor is therefore a design goal. Increased traction is generally associated with increased surface roughness of the striking face. Surface roughness is commonly expressed in terms of $R_a$, defined as follows:

$$R_a = \frac{1}{n}\sum_{i=1}^{n} |y_i|$$

where n is the number of sampling points and y is the deviation from a mean line (at a given sampling point). As a practical matter, $R_a$ represents the average of deviations from a mean line over a 2-dimensional sample length of a surface.

Another surface roughness parameter is known as $R_t$ (sometimes referred to as $R_y$). This parameter represents the maximum peak-to-trough distance in a given 2-dimensional sample length of a surface.

The regulations of the USGA limit the surface roughness of the striking face of golf clubs generally to a degree of roughness no greater than that imparted by sand-blasting or fine milling. In practical terms, this standard has been interpreted to mean a surface having a value of $R_a$ no greater than 0.0046 mm (180 µin.), and a value of $R_t$ of no more than 0.025 mm (1000 µin.). Thus, the need is evident to maximize the traction between the club face and the struck ball without exceeding the roughness maximum established by USGA rules.

Accordingly, a textured striking face for a golf club head has been sought that imparts a high degree of spin to the ball for a wide variety of golf shots under a wide variety of conditions, that has good wear characteristics, that complies with USGA rules, and that enhances (or at least does not detract from) the aesthetic qualities of the club head.

SUMMARY

In one aspect, the subject of the disclosure is a golf club head, comprising a heel portion, a toe portion, and a striking face defined between the heel portion and the toe portion, wherein the striking face includes a grid of horizontal score lines, a first textured surface pattern of micro-grooves intersecting the score lines, and a second textured surface pattern superimposed on the first textured surface pattern between the horizontal score lines of the grid. In another aspect, the subject of the disclosure is a method of forming a spin-inducing textured surface on a golf club head having a heel portion, a toe portion, and a striking face between the heel portion and the toe portion, wherein the method comprises (a) forming a grid of horizontal score lines on the striking face; (b) forming a first textured surface pattern of micro-grooves intersecting the score lines; and (c) forming a second textured surface pattern superimposed on the first textured surface pattern between the horizontal score lines of the grid. In a specific embodiment, the micro-grooves of the first textured surface pattern are formed by mechanical milling, and second textured surface pattern is formed by laser etching.

BRIEF DESCRIPTION OF THE DRAWINGS

FIG. 4 is a cross-sectional view taken along plane 4-4 of FIG. 2;

FIG. 5 is detail view of a portion of the cross-sectional view of FIG. 4;

FIGS. 9-11 are front views of a portion of a golf club head with a striking face plane corresponding to the plane of the paper, that show the steps of forming a spin-imparting textured striking face in accordance with an embodiment of this disclosure; and FIG. 12 is detail view of a portion of the front view of FIG. 11.

DETAILED DESCRIPTION

The drawings and their descriptions may indicate sizes, shapes and configurations of the various components. Such depictions and descriptions should not be interpreted as limiting. Alternative sizes, shapes and configurations are also contemplated as within the scope of this disclosure.

Figure 1:
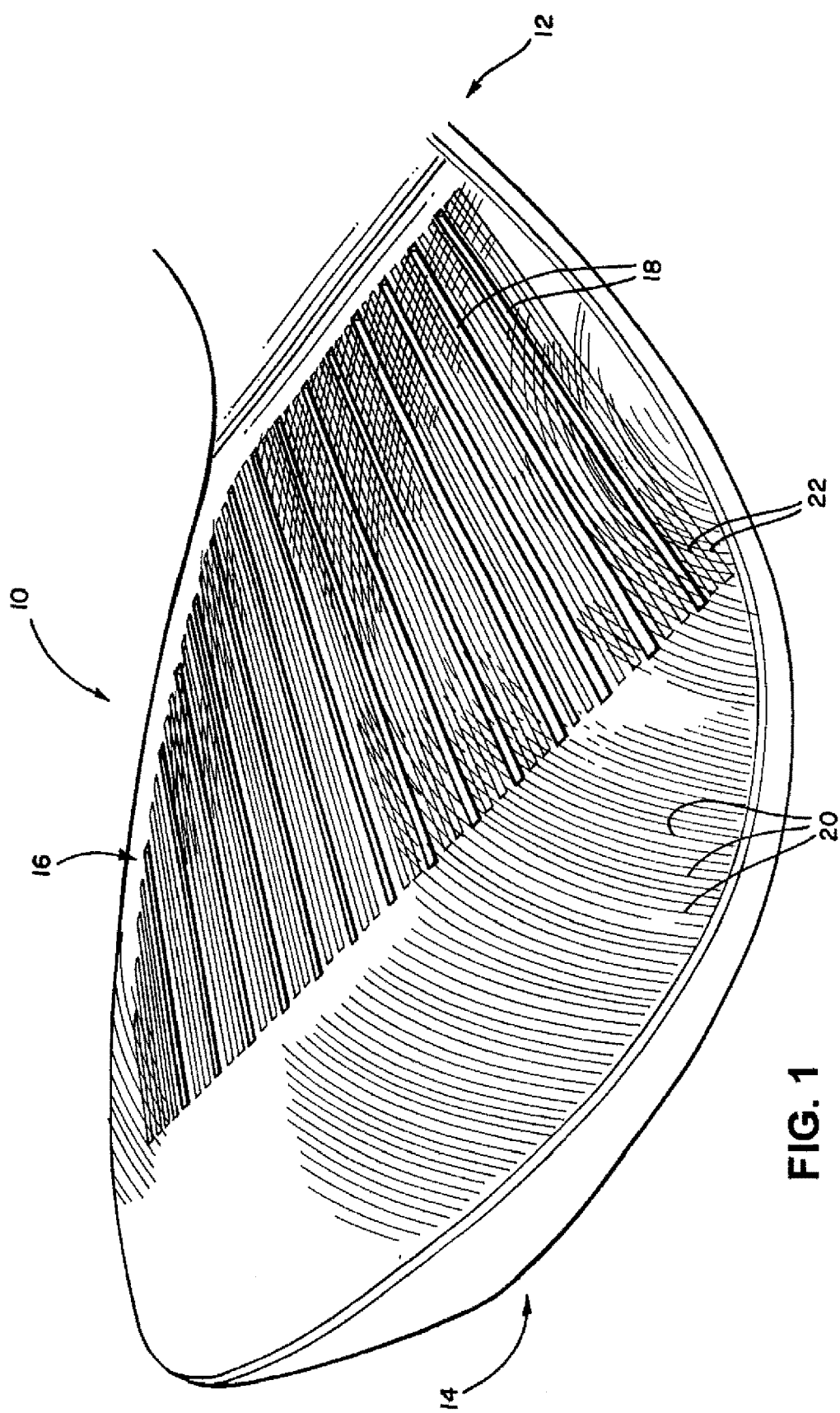
FIG. 1 is a front perspective view of a golf club head, showing a textured striking face in accordance with an embodiment of this disclosure.
Figure 2:
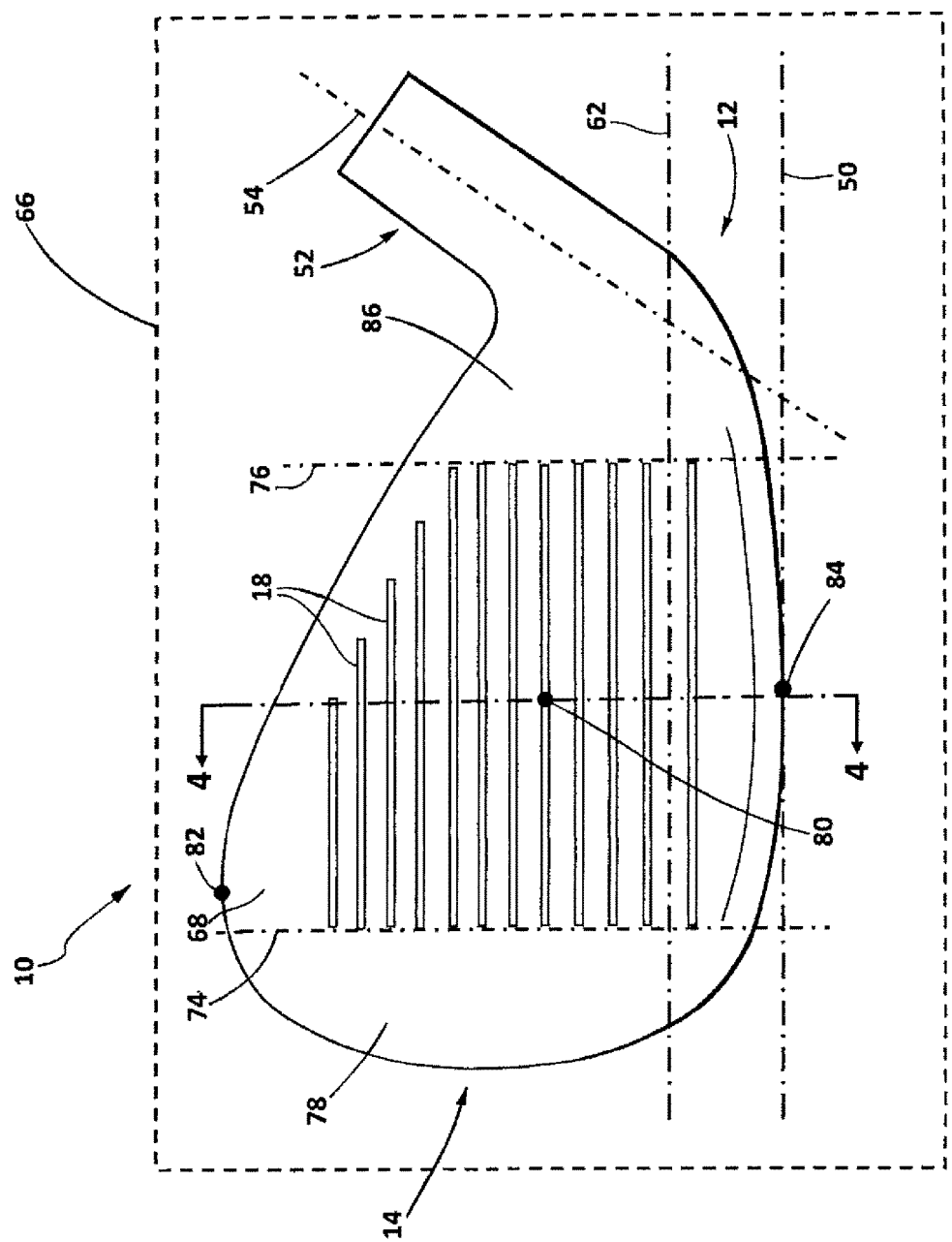
FIG. 2 is a front elevation view of the golf club head of FIG. 1.
Figure 3:
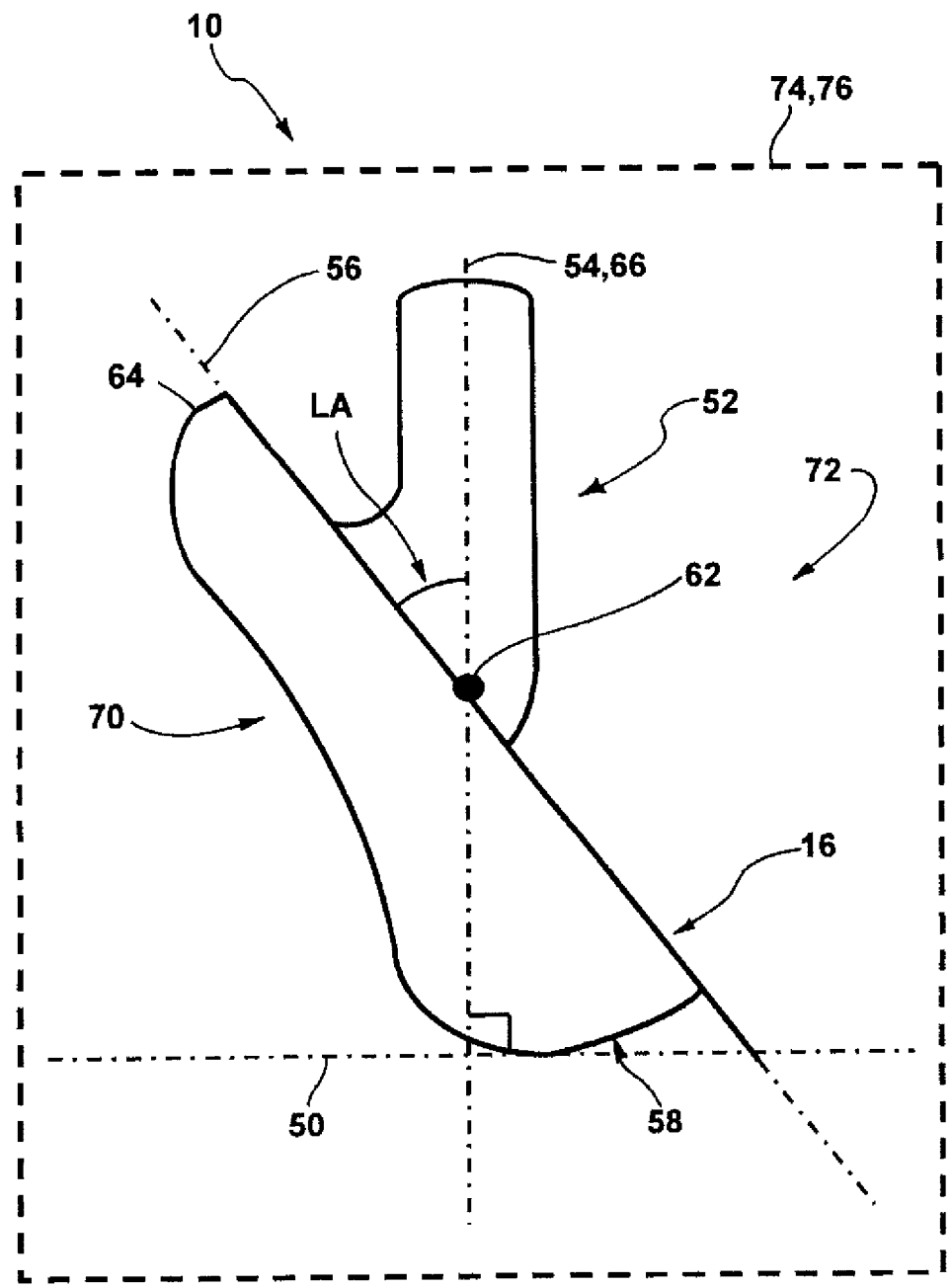
FIG. 3 is a toe side elevation view of the golf club head of FIG. 1.

Referring first to FIGS. 1 through 3, a golf club head 10 of the iron-type includes a heel portion 12, a toe portion 14 opposite the heel portion 12, a front portion 72, and a rear portion 70 opposite the front portion 72. The golf club bead 10 further includes a top portion 64 and a sole (bottom) portion 58 opposite the top portion 64. The heel portion 12 further includes a hosel 52 extending therefrom for associating the golf club head 10 with a shaft (not shown). The hosel 52 defines a virtual central hosel axis 54. The front portion 72 further includes a striking face 16, defined as the planar exterior surface portion of the front portion 72 that generally conforms to a virtual striking face plane 56 and is adapted to contact a golf ball at a factory-designated loft angle LA (see FIG. 3). The striking face 16 is formed with surface features that increase traction between the striking face and a struck golf ball, for both ensuring good contact with the ball (for example, in wet conditions), and imparting a degree of spin to the ball, e.g. for stability in flight. Included in these surface features is a grid of substantially parallel horizontal grooves or score lines 18. The score lines 18 and the other surface features will be described in detail below.

The golf club head 10 is preferably formed of a metal, e.g. titanium, steel, stainless steel, or alloys thereof. More preferably, the main body of the club head 10 is formed of 431 stainless steel or 8620 stainless steel. In some embodiments, the main body of the club head is integrally or unitarily formed, while in other embodiments, the main body is formed of plural components that are welded together or otherwise permanently associated with each other. For example, in some embodiments, the club head 10 is formed of a main body of a first material, and a striking wall (including the striking face 16) of a second material different from the first, and welded to the main body.

Referring to FIGS. 2 and 3, the golf club head 10 is shown in a "reference position." As used herein, "reference position" denotes a position of a golf club head, e.g. golf club head 10, in which the sole portion 58 of the golf club head 10 contacts a virtual ground plane 50 such that the hosel axis 54 of the hosel 52 lies in a virtual vertical hosel plane 66, which intersects the virtual striking face plane 56 to form a virtual horizontal line 62.

Referring specifically to FIGS. 2 and 3, a first virtual vertical plane 74 is perpendicular to the striking face plane 56 and passes through the ends of the score lines 18 proximate the toe portion 14. A second virtual vertical plane 76 is perpendicular to the striking face plane 56 and passes through the ends of the score lines 18 proximate the heel portion 12. The region of the striking face 16 toe-ward of the first virtual plane 74 constitutes a toe region 78 of the striking face 16. The region of the striking face 16 heel-ward of the second virtual plane 76 constitutes a heel region 86 of the striking face 16. The region of the striking face 16 between, and delimited by, the first and second virtual planes 74 and 76 constitutes a central region 68.

Referring specifically to FIG. 2, the striking face 16 further comprises a face center 80. The face center 80 is located equidistant between the first virtual plane 74 and the second virtual plane 76. The face center 80 is also equidistant between an uppermost point 82 of the striking face 16 and a lowermost point 84 of the striking face 16.

In alternative embodiments, the golf club head 10 is of a type other than an iron-type as described above. Nonetheless, the type and, relatedly, the loft angle of the golf club head 10 are preferably selected such that the effect of any imposed surface texture described below, on ball trajectory, is desirable. For example, backspin production is generally a more desirable feature of high-lofted iron-type clubs and wedges. As the golfer nears the pin, precision in golf shots generally becomes more critical than other considerations, such as distance. As another example of desirability, the effect of traction between a striking face and a golf ball is understood to categorically differ between differently-lofted club heads. Golf balls, over the duration of contact with a club head having a relatively low loft angle, have been observed to follow a retrograde motion, i.e., they travel upwardly, change course, and return downwardly, resulting in forward spin. Golf balls, over the duration of contact with a club head having a relatively high loft angle, have been observed to travel only upwardly, resulting in backspin. Because of these considerations, the striking face surface textures variously described below are preferably applied to a club head of a loft angle no less than about 15°, more preferably no less than about 18°, and even more preferably no less than about 35° (e.g. a wedge-type golf club head).

As shown in FIGS. 1 and 2, the striking face 16 includes a grid comprising a plurality of substantially horizontal score lines 18, typically formed by mechanical milling (e.g. spin-milling). Alternatively, in some embodiments, the score lines 18 are formed by stamping, casting, or other known method. The score lines 18 typically have an average width no less than 0.1 mm, more preferably between about 0.25 mm and 1.0 mm, and even more preferably, substantially equal to about 0.90 mm. For all purposes herein, score line width is to be determined using the "30 degree method of measurement" (as described in Appendix II of the USGA Rules of Golf, Effective Jan. 1, 2012). Additionally, or alternatively, the score lines 18 have an average depth of no less than about 0.10 mm, more preferably between about 0.25 and about 0.60 mm, and most preferably substantially equal to about 0.51 mm. The length and number of score lines 18, and the spacing between them, are generally selected as to conform to USGA regulations. For all purposes herein, the "depth" of a score line, e.g. score lines 18, is measured from the general planar surface of the striking face 16, which thus constitutes a datum plane. Additionally, or alternatively, the score lines 18 each have a maximum width and a maximum depth within the respective ranges of average width and average depth discussed above.

The striking face 16 is also provided with a first textured surface pattern comprising a first plurality of very narrow, relatively shallow grooves 20, which may be called "micro-grooves." The first plurality of micro-grooves 20, which may be formed by precision mechanical milling (e.g., CNC milling), is advantageously formed as a pattern of substantially parallel, arcuate lines intersecting the score lines 18. The first textured surface pattern formed by the micro-grooves 20 preferably covers at least the central region 68 of the striking face, and preferably extends at least partly into the toe region 78. More preferably, the first textured surface pattern extends at least partly into the toe region 78 and the heel region 86. Preferably, the first textured pattern extends toward the toe portion past the uppermost point 82 of the club head 10 (see FIG. 2). In some embodiments, the first textured pattern covers the majority, and in some cases the entirety, of the toe region 78 of the striking face 16. Alternatively, or in addition; the first textured surface pattern covers the entirety of the striking face 16 of the club head 10.

Figure 5A:
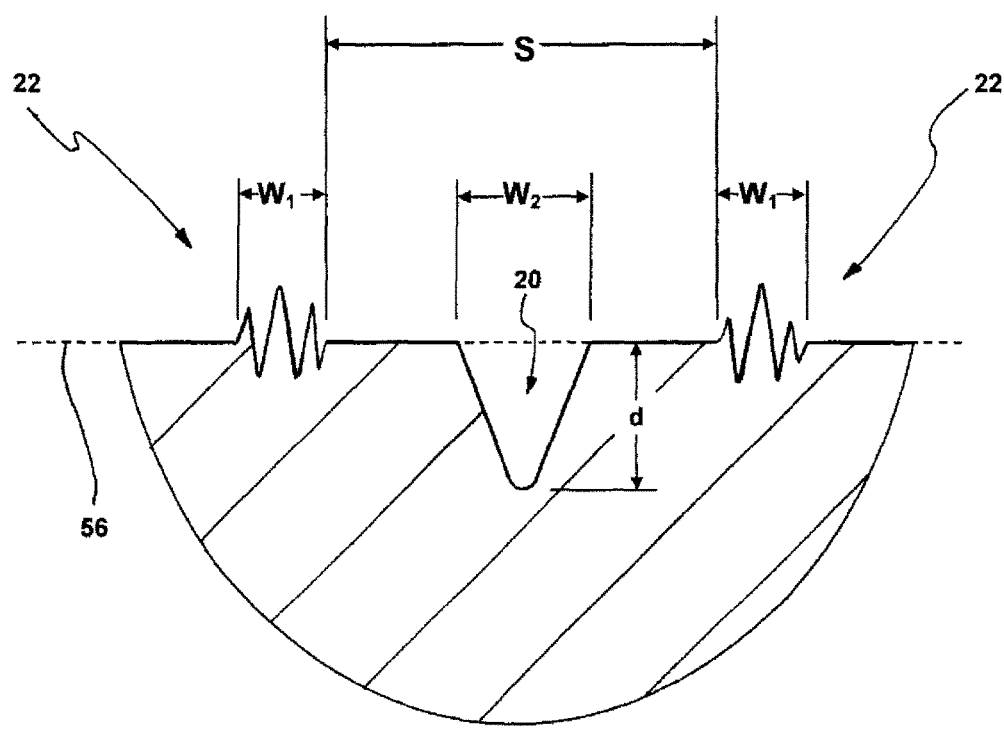
FIG. 5A is a detail view of a portion of the cross-sectional view of FIG. 5.

The micro-grooves 20 preferably have an average depth (measured in accordance with depth d as shown in FIG. 5A) no greater than 0.025 mm (1000 μin.), more preferably between 0.015 mm (600 μin.) and 0.025 mm (1000 μin.), and even more preferably between 0.020 mm (800 μin.) and 0.025 mm (1000 μin.). Additionally, or alternatively, the microgrooves 20 preferably have an average width (measured in accordance with width $w_2$ of FIG. 5A) of between (0.25 mm (0.010 in.) and 0.51 mm (0.020 in.), more preferably between 0.30 mm (0.012 in.) and 0.43 mm (0.017 in.). The dimensions of the micro-grooves 20 and the spacing between them will have a significant effect on the value of $R_a$ of the striking face. Thus, these dimensional parameters must be selected so that the maximum permitted value of $R_a$ noted above is not exceeded. However, because of normal surface variation and machine tolerances, a sample pool of club heads having micro-grooves intended to effect a specific target surface roughness $R_a$ value may likely effect surface roughness $R_a$ values dispersed about a range. Consequently, as a practical matter, the first textured surface pattern is preferably selected to produce an average value of $R_a$ close to, but still somewhat less than, the desired optimal value of $R_a$. Likewise, the first textured surface pattern also produces a first value of $R_t$, (which may be termed "$R_{t1}$"), that may advantageously be somewhat less than the desired optimum value of $R_t$.

The striking face 16 is further provided with a second textured surface pattern superimposed on the first textured surface pattern at least in the region of the striking face occupied by the score lines 18 (i.e. the central region 68). The second textured surface pattern is advantageously provided by a series of textured or roughened regions, each of which is formed between an adjacent pair of score lines 18. In the illustrated exemplary embodiment, the textured or roughened regions are formed as a plurality of interposed textured surface treatment regions 22, with at least one, and preferably two or more, of the plurality of textured surface treatment regions 22 formed between each adjacent pair of score lines 18. The textured surface treatment regions 22 are advantageously configured and formed as horizontal etch lines, as described in detail below. In some embodiments, as shown e.g. in FIG. 1, adjacent pairs of horizontal etch lines are coupled by vertical end lines.

Preferably, the club head 10 includes the textured surface treatment regions 22 in a repetitive pattern having a surface density of four such regions 22 extending horizontally between each pair of the score lines 18. In alternative embodiments, the textured surface treatment regions 22 are generally linear and extend obliquely, i.e. at an angle relative to the ground plane 50 (e.g. between 5° and 25°, measured in the striking face plane 56), when the club head 10 is in the reference position. In yet other embodiments, the textured surface treatment regions 22 follow an arcuate path and/or an intermittent path. However, the textured surface treatment regions 22 preferably extend horizontally, and in parallel relation to each other. These configurations and orientations aid a golfer in aligning the club head 10 and avoid—in combination with the first textured surface pattern (e.g. the micro-grooves 20)—an interference pattern that may distract or irritate the golfer, thus negatively affecting performance. Preferably, the interposed textured surface treatment regions 22 are spaced from any score lines 18. This provides for maintained structurally integrity of, and thus an enduring effect on performance by, the score lines 18.

Figure 6:
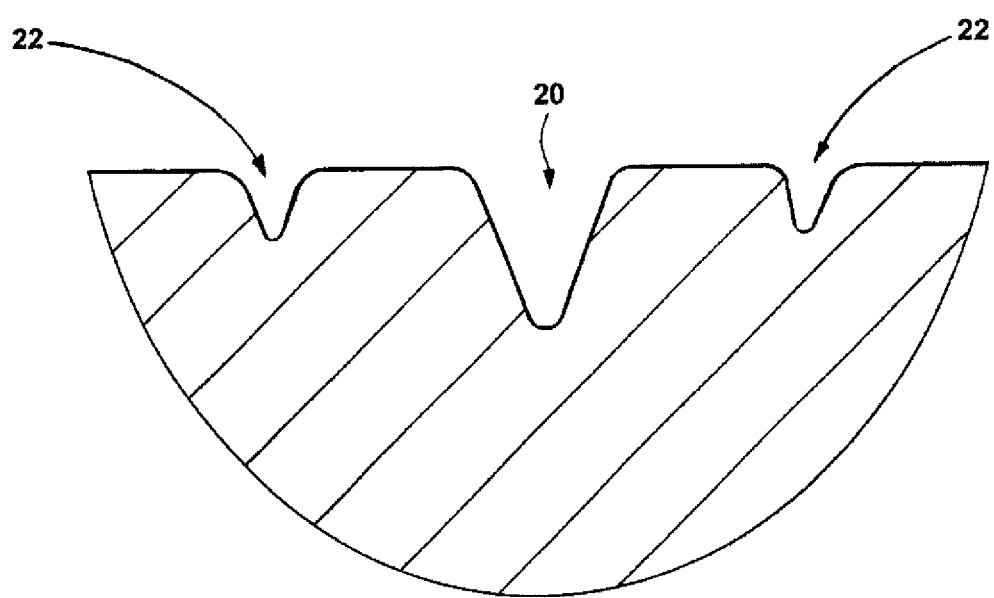
FIG. 6 is detail view of a portion of the cross-sectional view of FIG. 4 according to another embodiment of this disclosure.
Figure 7:
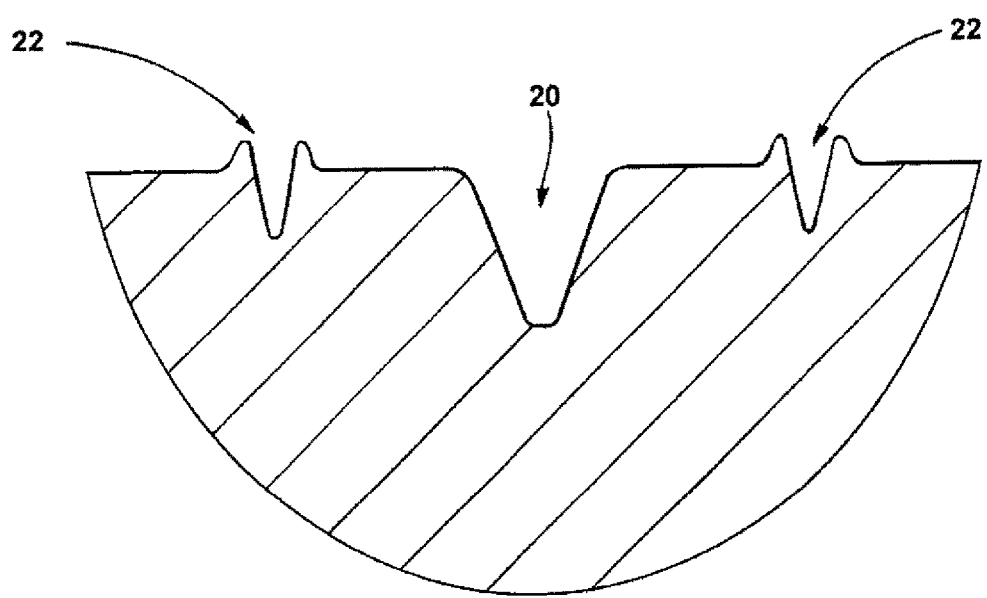
FIG. 7 is a detail view of a portion of the cross-sectional view of FIG. 4 according to another embodiment of this disclosure.

An exemplary textured striking face configuration is shown in FIG. 4. The score lines 18, micro-grooves 20, and the textured surface treatment regions 22 are not shown to scale, and the illustrated cross-sectional shapes of these features are exemplary only. For example, the textured surface treatment regions 22 may have a generally U-shaped cross-section, as shown, or they may have an irregular cross-section, depending on the particular way they are formed, as described below. In FIG. 5A, each of the textured surface treatment regions 22 is shown as having a width $W_1$ and an irregular cross-section. However, in alternative embodiments, the textured surface treatment regions 22 are generally U-shaped in cross-section (see, e.g., FIGS. 5 and 6), and may optionally have raised edges (see, e.g., FIG. 7).

In any previously-described embodiment, each textured surface treatment region 22 is defined as a region of the striking face having textural characteristics that contrast with the general texture of its surrounding area, which texture generally corresponds to the process by which it is formed. In addition, preferably, each textured surface treatment region also constitutes a coterminous region that is visually distinct from its surrounding area, such as, for example, having a distinct color, light reflectance property, or other visual quality.

The textured surface treatment regions 22 are preferably of a scale less than that of the score lines 18, to ensure that the configuration of the striking face 16 conforms to USGA regulations. For example, the textured surface treatment regions 22 preferably each have an average width (measured in accordance with $w_1$ of FIG. 5A) no less than 0.01 mm, more preferably no less than 0.10 mm, and even more preferably between about 0.10 mm and about 1.0 mm. Additionally, or alternatively, the textured surface treatment regions 22 include a maximum width of a value similar to the values described with regard to average width.

Superimposing the second textured surface pattern on the first textured surface pattern increases the value of $R_t$ of the striking face 16 from $R_{t1}$ to a higher value ($R_{t2}$). Therefore, the dimensions of the textured surface treatment regions 22 of the second textured surface pattern should be selected so that $R_{t2}$ does not exceed the above-noted maximum permitted value of $R_t$.

The textured surface treatment regions 22 of the second textured surface pattern may be mechanically milled, but, as described below, in a preferred embodiment, they are laser-etched into the striking face 16. One advantage of laser etching is believed to be that the surface texture created by the removal of metal (e.g. by vaporization and/or by sloughing off micro-flakes) by the laser in forming the textured surface treatment regions 22 provides a particularly effective spin-enhancing frictional engagement with the elastomer coating of a struck golf ball. Moreover, laser-etching, as combined with the mechanically milling used to form the first textured surface pattern (i.e., the micro-grooves 20), allows the value of $R_t$ to be controlled quite precisely, and it reduces the dispersion of the values of $R_a$, thereby allowing the value of $R_a$ achieved by milling the micro-grooves 20 to assume an average value closer to the above-noted maximum permitted value. Laser etching also, by its nature, constitutes a localized heat treating operation. Thus, the regions structurally affected by the laser etching process, i.e. the textured surface treatment regions 22, also constitute coterminous heat-treated regions.

Alternative, or additional, processes for forming the textured surface treatment regions 22, which may achieve one or more of the above advantages, include chemical etching, local media blasting (e.g. peening or sandblasting), local oxidizing or other chemical roughening process, micro-milling, or local coating of the striking face 16 with a rough material.

Figure 8:
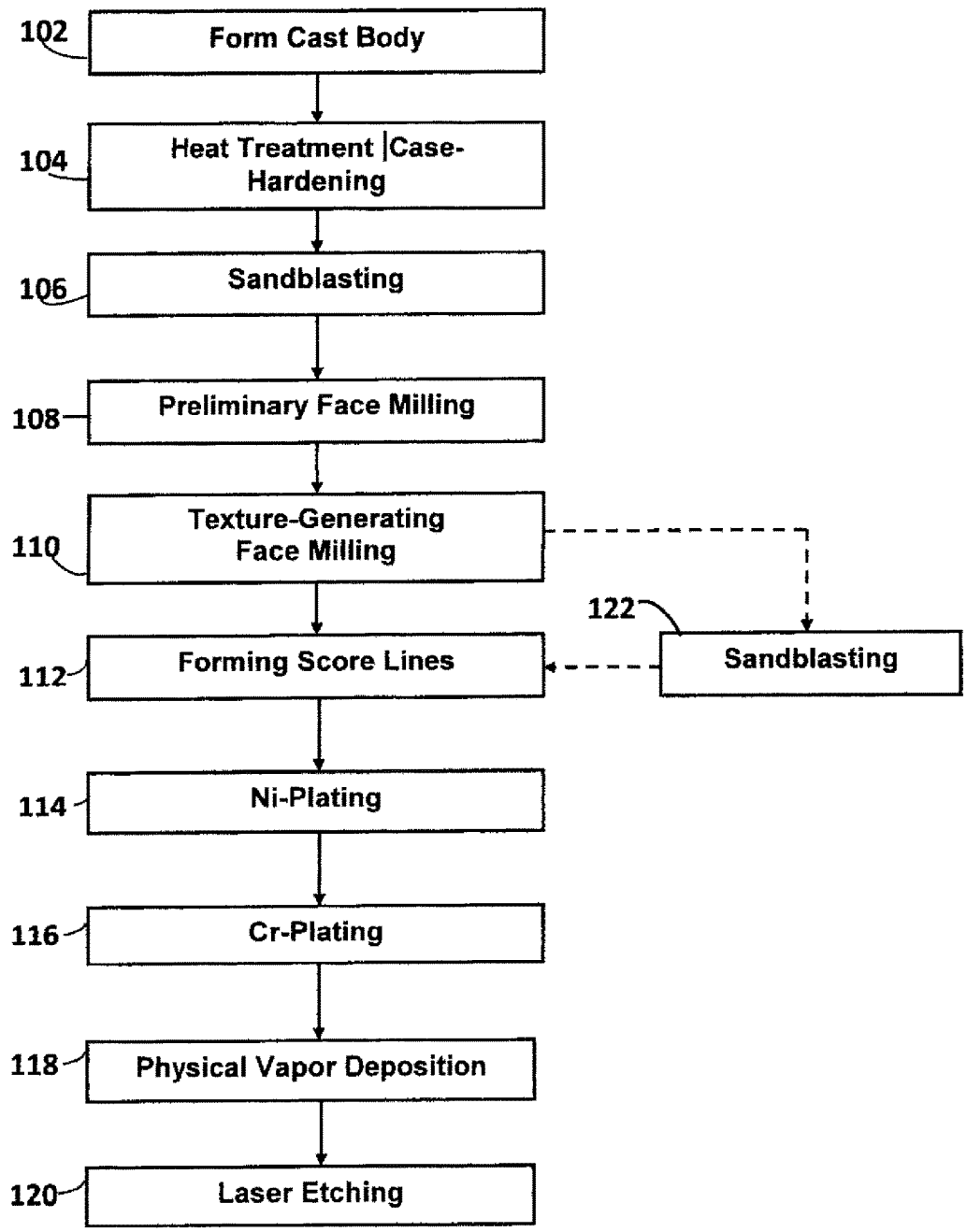
FIG. 8 is a flow chart illustrating a method of forming a textured striking surface on a golf club head in accordance with an embodiment of this disclosure.

Referring to FIG. 8, an exemplary process 101 for forming the striking face texture of FIG. 1 is shown. FIGS. 9 through 12 illustrate the club head 10 after performance of the steps of the process 101 shown in FIG. 8. In each of FIGS. 9 through 12, the club head 10 is oriented such that the striking face plane 56 coincides with the plane of the paper. The relative order of the various steps of the process 101 is for purposes of exemplification. One of ordinary skill in the art would appreciate that, unless indicated otherwise, various steps of the process 101 may be omitted, or the relative order of such steps may be altered without departing from the spirit and scope of the invention.

In step 102, a club head body is cast. In alternative embodiments, a main body is formed by forging and/or machining. Once formed, in step 104, the club head body optionally undergoes a heat treatment process, whereby the club head body is case-hardened. Alternatively, or in addition, the club head body is cold-worked or otherwise forged to more advantageously tailor the body's material properties.

Next, in step 106, the main body is optionally polished by means of a sandblasting process (or other media blasting process). This step 106 helps to remove any burrs or flashing that may have resulting from the casting operation. In addition, the sandblasting process provides a foundation for an aesthetically pleasing final product.

Once sandblasted, in step 108, the main body undergoes a preliminary milling operation particularly directed at the striking face 16. The preliminary milling operation is preferably carried out using a machine bit, feed rate, and spin rate such that a resulting roughness value, e.g. $R_a$ value, is relatively low (e.g. an $R_a$ value less than 0.0033 mm or 130 µin.). In practical terms, this process is carried out as to preferably not result in any visually discernible ridges (e.g. using a cutting bit having a profile of a sufficiently high radius of curvature). In this manner, further texture-enhancing processes may effect a final striking face 16 having metrological properties closer to target and more consistent from sample to sample.

Figure 9:
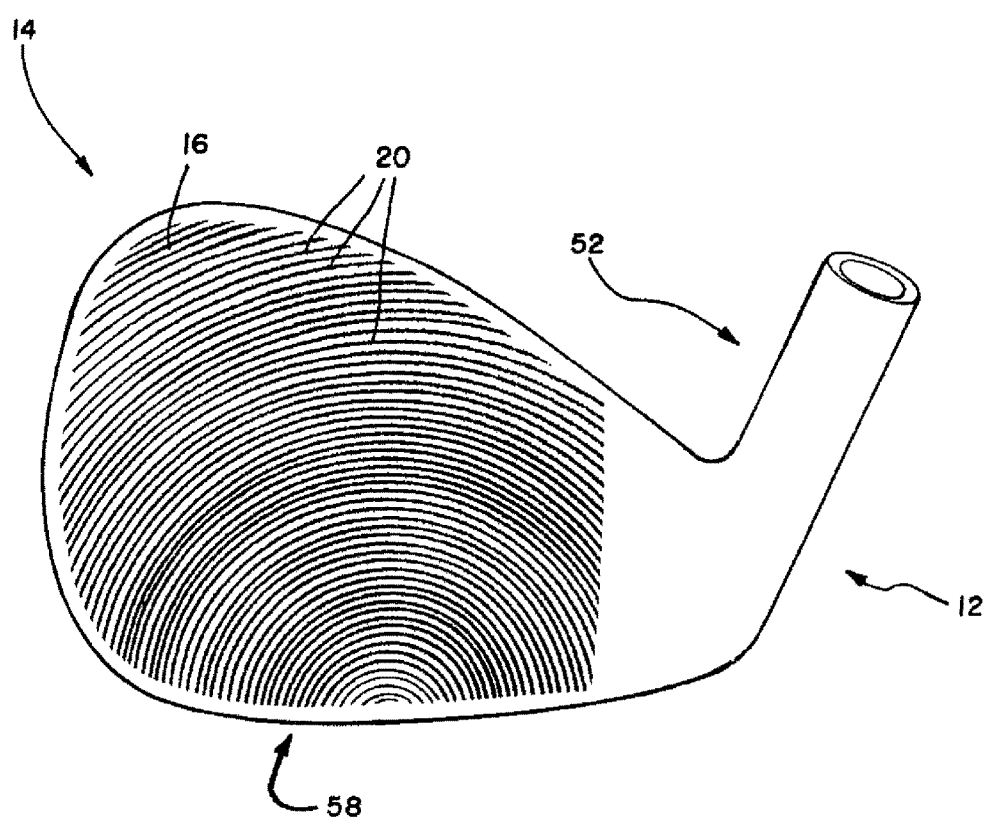

After the preliminary milling operation of step 108, the striking face 16 is milled under a different set of machining parameters to provide a milled surface having different visual and tactual characteristics, e.g. to produce the micro-grooves 20 discussed above, in step 110. FIG. 9 shows the striking face 16 after the micro-grooves 20 have been formed by mechanical milling, optionally using CNC, to create the first textured surface pattern. In alternative embodiments, an arcuate ridge pattern is stamped into the striking face 16 of the club head body. In the illustrated exemplary embodiment, the first textured surface pattern comprises a plurality of closely-spaced, substantially parallel, arcuate micro-grooves 20 that extend over substantially all of the striking face 16, as defined above. In a particular example, the micro-grooves 20 produced by this step are spaced (from center to center) by a distance preferably no more than about 1.0 mm (0.04 in.), more preferably within the range of about 0.25 mm (0.01 in.) to about 1.0 mm (0.04 in.), and even more preferably equal to about 0.6 mm (0.024 in.). Also, after step 110, the club head striking face 16 preferably has an $R_a$ value no less than about 0.0027 mm (110 µin.), more preferably within the range of about 0.0030 mm (120 µin.) and 0.0043 mm (170 µin.), and even more preferably equal to about 0.0032 mm (125 µin.). Additionally, or alternatively, the striking face 16, in this intermediate state, has an $R_t$ value of about 0.014 mm (550 µin.).

In some embodiments, an additional sandblasting operation is carried out in step 122. It may be advantageous to treat the striking face by conventional sandblasting, preferably immediately after the mechanical milling steps (steps 108 and 110). Sandblasting may be performed for a variety of reasons, such as providing a particular aesthetic appearance, and deburring and cleaning the striking face after the milling step is performed. There are data indicating that sandblasting may increase the value of $R_t$, thus requiring a corresponding adjustment of parameters used in the laser etching step to assure that the maximum permitted value of this parameter is not exceeded. After such sandblasting, these roughness values were increased by about 0.00013 mm to 0.00026 mm (5 to 10 µin.), preferably to about 0.0033 mm (130 µin.) ($R_a$) and about 0.018 mm (725 µin.) ($R_t$). Subsequent polishing may be carried out to more sharply define the edges of the region of the striking face 16 occupied by the arcuate micro-grooves 20. In some embodiments, as shown, this first texture region is cut off sharply, forming a vertical boundary, proximate the heel portion 12 of the club head 10.

Figure 10:
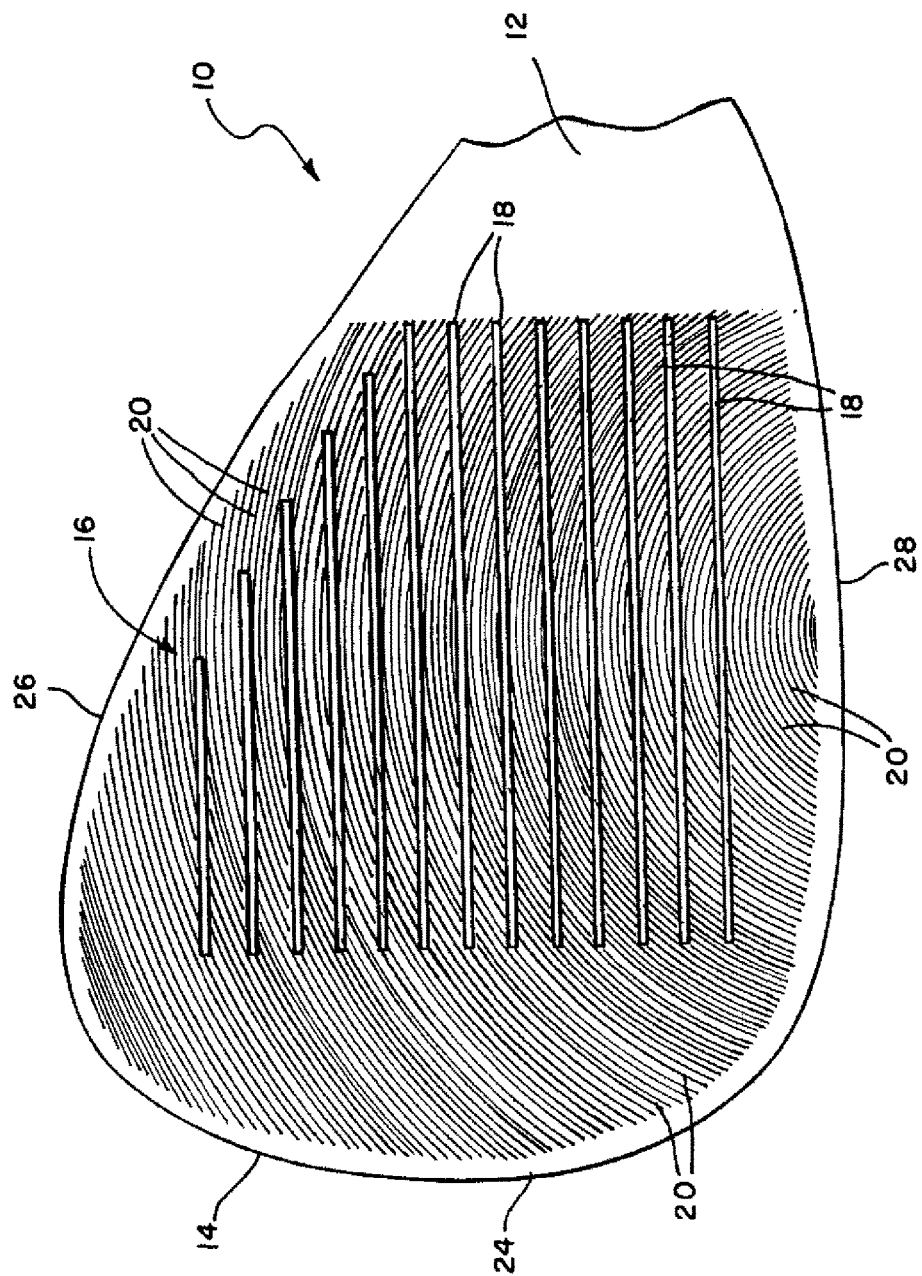

Next, the score lines 18 are formed on the striking face 16, forming an intermediate club head body configuration as shown in FIG. 10. In alternative embodiments, the score lines 18 are integrally cast into the main body as a whole. In other embodiments, the scorelines 18 are stamped. However, preferably, the score lines 18 are formed by milling, optionally spin-milling. This method is advantageous in its precision. Preferably, the formation of the score lines 18 occurs subsequent to the formation of the milled first texture pattern. In this manner, greater consistency in roughness may be achieved as the milling bit described above may be applied with even pressure throughout. Further, the score lines 18 may be formed with greater precision and more sharply-defined edges.

In some embodiments, after the score lines 18 are formed, the club head 10, or just the striking face 16, may optionally be plated or coated with a metallic layer, or treated chemically or thermally. Such treatments are well-known, and may enhance the aesthetic qualities of the club, and/or one or more utilitarian aspects of the club (such as durability or rust-resistance). For example, in some embodiments, in step 114, the club head 10 is nickel-plated and optionally subsequently chrome-plated in step 116. Such plating enhances the rust-resistance characteristics of the club head. Further, such plating improves the aesthetic quality of the club head 10, and it may serve as a substrate for any future laser etching process. Plating selection is also believed to have an effect on the visual and/or textural characteristics of subsequently-formed laser-etched regions superimposed thereon. Optionally, subsequent to the nickel- and chrome-plating steps 114 and 116, the striking face undergoes a physical vapor deposition ("PVD" herein) process. Preferably, the PVD operation results in a layer that comprises either a pure metal or a metal/non-metal compound. Preferably, the PVD-formed layer comprises a metal comprising at least one of: vanadium, chromium, zirconium, titanium, niobium, molybdenum, hafnium, tantalum, and tungsten. More preferably, the PVD-applied layer is characterized as a nitride, a carbide, an oxide, or a carbonitride. For example, a layer of any of zirconium nitride, chromium nitride, and titanium carbide may be applied, depending on the desired visual effect (e.g. color) and/or material properties. Preferably, the PVD operation results in a layer of titanium carbide. This process enhances the aesthetic quality of the club head 10, while also increasing the durability of the striking face 16.

Next, a laser etching operation 120 is carried out, thus forming the textured surface treatment regions 22. FIGS. 1, 11, and 12 show the striking face 16 after the textured surface treatment regions 22 have been formed. As shown, the textured surface treatment regions 22 create the second textured surface pattern, superimposed on the first textured surface pattern. In the illustrated exemplary embodiment, two or more substantially parallel textured surface treatment regions 22 are formed between each adjacent pair of score lines 18, and several more textured surface treatment regions 22 are advantageously formed both above an uppermost score line 18a and below a lowermost score line 18b (see FIGS. 11 and 12). The textured surface treatment regions 22 advantageously occupy at least approximately the portion of the striking face 16 that is occupied by the grid of score lines 18, i.e., the central region 68. Advantageously, the textured surface treatment regions 22 may extend farther toward the heel portion 12 than some or all of the score lines 18. The laser etching operation 120 is preferably carried out after the score line forming process 112 in part such that the score lines 18 provide a basis for properly and efficiently aligning the feed direction of the laser.

After laser etching, the value of $R_a$ may not be appreciably increased, but other benefits are suggested by empirical data of the combined effect of the laser-etched regions and the mechanically milled regions. For example, this combination appears to provide a low-cost resultant texture that bears a narrower margin of error of roughness over a sample set as compared with mechanical milling alone. Because of a smaller tolerance window, the target $R_a$ can be raised closer to the maximum under USGA regulations. Preferably, the final striking face surface roughness ($R_a$) is within the range of 0.0030 mm (120 μin.) and 0.0047 mm (185 μin.). Also, the value of $R_t$ was increased to as much as about 0.024 mm (950 μin.), thus providing for consistently approaching the maximum $R_t$ limit set by the USGA.

In the exemplary embodiment, each of the textured surface treatment regions 22 is formed as a series of etched lines by a pulsed laser, preferably with a wavelength within the range of about 900 nm to about 1200 nm, more preferably within the range of about 1000 nm to about 1100 nm, and most preferably equal to about 1064 nm. Each of the etched lines is preferably formed by a first pass of the laser head in a first direction, and a second pass in the opposite direction. The power, pulse rate, and linear speed of the laser head will depend on the particular surface treatment of the striking face. For example, if the striking face 16 is subjected to physical vapor deposition (PVD) (e.g. in step 118), the first pass may be performed at a pulse rate of 20 KHz, a power of about 4.2 KW, and a linear speed of 800 mm/sec, while the second pass may be performed at a pulse rate of 10 KHz, a power of about 3.5 KW, and a linear speed of 180 mm/sec. For a chrome-plated striking face, the first pass may be performed at a pulse rate of 10 KHz, a power of about 3.5 KW, and a linear speed of 180 mm/sec, while the second pass may be performed at a pulse rate of 20 KHz, a power of about 4.2 KW, and a linear speed of 800 mm/sec. Using these laser settings, a value of $R_t$ very close to 0.025 mm (1000 μin.) can be achieved (e.g., about 950 μin. or 0.024 mm) with the etched lines having the following physical parameters (and assuming a milled texture in accordance with the design parameters described above):

| | |
|---|---|
| Width of the laser-etched region created by each pass: | 0.11 mm |
| Total laser-etched region width: | 0.36 mm |
| Distance between adjacent laser-etched regions: | 0.67 mm |

It will be understood that lasers with different operational parameters (e.g., wavelength, power, pulse rate, and/or linear head speed) from those described above in the exemplary embodiment may be used to achieve values of $R_t$ that are close to, but that do not exceed, the above-noted maximum permitted value. Also, the distance between adjacent laser-etched regions corresponds to the distance S of FIG. 5A.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A golf club head comprising:
   a heel portion;
   a toe portion;
   a hosel; and
   a striking face including:
      a virtual striking face plane defined by the striking face; and
      a central region comprising:
         a plurality of scorelines, each having an average depth no less than about 0.10 mm below the virtual striking face plane and extending between the heel portion and the toe portion;
         a plurality of textured surface treatment regions, each textured surface treatment region comprising an edge raised above the virtual striking face plane and extending along a generally linear path farther toward the heel portion than some of the scorelines; and a surface roughness Rt less than or equal to about 0.024 mm.

2. The golf club head of claim 1, wherein the plurality of textured surface treatment regions comprise four textured surface treatment regions formed between two adjacent scorelines.

3. The golf club head of claim 1, wherein the plurality of textured surface treatment regions extend generally parallel to one another and the plurality of scorelines.

4. The golf club head of claim 3, wherein each of the plurality of textured surface treatment regions is spaced apart from adjacent textured surface treatment regions by a substantially uniform distance.

5. The golf club head of claim 1, wherein the striking face has a surface roughness Ra between about 0.0030 mm and about 0.0047 mm.

6. The golf club head of claim 1, wherein the plurality of textured surface treatment regions are formed by micro-milling.

7. The golf club head of claim 1, wherein the golf club head is composed of steel.

8. The golf club head of claim 1, further comprising a physical vapor deposition-formed layer.

9. The golf club head of claim 8, wherein the physical vapor deposition-formed layer comprises at least one of: a nitride, a carbide, an oxide, and a carbonitride.

10. The golf club head of claim 1, wherein the club head has a loft angle of at least 35°.

11. The method of claim 1, wherein the striking face is formed to have a surface roughness Ra between about 0.0030 mm and about 0.0047 mm.

12. A method of making a golf club head, the method comprising:
    on a club head main body that has a striking face with a virtual striking face plane defined by the striking face, milling a plurality of scorelines, each scoreline having an average depth no less than about 0.10 mm below the virtual striking face plane and extending between heel and toe portions of the club head main body; and
    on a central region of the striking face, micro-milling a plurality of textured surface treatment regions, each textured surface treatment region comprising an edge raised above the virtual striking face plane and extending along a generally linear path farther toward the heel portion than some of the scorelines, such that a surface roughness Rt of the central region is less than or equal to about 0.024 mm.

13. The method of claim 12, wherein the plurality of textured surface treatment regions comprise four textured surface treatment regions formed between two adjacent scorelines.

14. The method of claim 12, wherein the plurality of textured surface treatment regions are formed to extend generally parallel to one another and the plurality of scorelines.

15. The method of claim 14, wherein forming the plurality of textured surface treatment regions includes spacing each of the plurality of textured surface treatment regions from adjacent textured surface treatment regions by a substantially uniform distance.

16. The method of claim 12, wherein the club head main body is composed of steel.

17. The method of claim 16, wherein the physical vapor deposition layer comprises at least one of: a nitride, a carbide, an oxide, and a carbonitride.

18. The method of claim 12, further comprising forming a physical vapor deposition layer.

19. The method of claim 12, wherein the club head has a loft angle of at least 35°.

20. A method of making a golf club head, the method comprising:
    on a club head main body that has a striking face with a virtual striking face plane defined by the striking face, stamping a plurality of scorelines, each scoreline having an average depth no less than about 0.10 mm below the virtual striking face plane and extending between heel and toe portions of the club head main body; and
    on a central region of the striking face, micro-milling a plurality of textured surface treatment regions, each textured surface treatment region comprising an edge raised above the virtual striking face plane and extending along a generally linear path farther toward the heel portion than some of the scorelines, such that a surface roughness $R_t$ of the central region is less than or equal to about 0.024 mm and each of the plurality of textured surface treatment regions comprises a coterminous region that is visually distinct from its surrounding area.

* * * * *